United States Patent
Pawlow et al.

(10) Patent No.: US 8,058,351 B2
(45) Date of Patent: Nov. 15, 2011

(54) METHOD FOR PREPARING LOW MOLECULAR WEIGHT POLYMERS

(75) Inventors: James Pawlow, Akron, OH (US); James Hall, Mogadore, OH (US); Jason Poulton, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 529 days.

(21) Appl. No.: 11/920,682

(22) PCT Filed: May 19, 2006

(86) PCT No.: PCT/US2006/019507
§ 371 (c)(1),
(2), (4) Date: Nov. 19, 2007

(87) PCT Pub. No.: WO2006/127483
PCT Pub. Date: Nov. 30, 2006

(65) Prior Publication Data
US 2009/0105423 A1    Apr. 23, 2009

Related U.S. Application Data

(60) Provisional application No. 60/682,938, filed on May 20, 2005.

(51) Int. Cl.
*C08F 236/12* (2006.01)
*C08C 19/02* (2006.01)
*C08L 9/00* (2006.01)
*C08F 255/00* (2006.01)

(52) U.S. Cl. ........ 525/245; 525/288; 525/242; 525/319; 556/431; 528/15; 528/19

(58) Field of Classification Search .................. 556/431; 528/15, 19; 525/288, 319, 242, 245
See application file for complete search history.

(56) References Cited

U.S. PATENT DOCUMENTS

| | | | |
|---|---|---|---|
| 3,816,382 A | 6/1974 | Streck et al. | |
| 3,816,384 A | 6/1974 | Streck et al. | |
| 3,857,825 A | 12/1974 | Streck et al. | |
| 3,920,715 A | 11/1975 | Streck et al. | |
| 3,929,714 A | 12/1975 | Streck et al. | |
| 3,929,850 A | 12/1975 | Streck et al. | |
| 4,179,415 A | 12/1979 | Bemmels | |
| 4,392,001 A | 7/1983 | Don et al. | |
| 4,590,319 A | 5/1986 | Imaki et al. | |
| 4,727,215 A | 2/1988 | Schrock | |
| 5,242,986 A | 9/1993 | Gibler et al. | |
| 5,312,940 A | 5/1994 | Grubbs et al. | |
| 5,342,909 A | 8/1994 | Grubbs et al. | |
| 5,446,102 A | 8/1995 | Oziomek et al. | |
| 5,589,600 A | 12/1996 | Fischer et al. | |
| 5,679,762 A | 10/1997 | Yoshida et al. | |
| 5,728,917 A | 3/1998 | Grubbs et al. | |
| 5,808,126 A * | 9/1998 | Brzezinska et al. | 556/431 |
| 5,831,108 A | 11/1998 | Grubbs et al. | |
| 5,880,231 A | 3/1999 | Grubbs et al. | |
| 5,969,170 A | 10/1999 | Grubbs et al. | |
| 6,111,121 A | 8/2000 | Grubbs et al. | |
| 6,184,307 B1 | 2/2001 | Schisla | |
| 6,211,391 B1 | 4/2001 | Grubbs et al. | |
| 6,300,451 B1 | 10/2001 | Mehta et al. | |
| 6,465,590 B1 | 10/2002 | Maughon et al. | |
| 6,593,005 B2 | 7/2003 | Tau et al. | |
| 6,624,265 B2 | 9/2003 | Grubbs et al. | |
| 6,696,597 B2 | 2/2004 | Pederson et al. | |
| 6,777,490 B2 | 8/2004 | Müssig et al. | |
| 6,803,429 B2 | 10/2004 | Morgan et al. | |
| 6,806,325 B2 | 10/2004 | Grubbs et al. | |
| 6,867,274 B2 | 3/2005 | Maughon et al. | |
| 7,022,789 B2 | 4/2006 | Maughon et al. | |
| 2003/0088035 A1 | 5/2003 | Guerin et al. | |
| 2003/0236427 A1 | 12/2003 | Grubbs et al. | |
| 2004/0097745 A9 | 5/2004 | Grubbs et al. | |
| 2006/0173145 A1 | 8/2006 | Pawlow et al. | |

FOREIGN PATENT DOCUMENTS

| | | |
|---|---|---|
| WO | WO 02/100905 A1 | 12/2002 |
| WO | WO 02/100941 A1 | 12/2002 |
| WO | WO 03/002613 A1 | 1/2003 |
| WO | WO 2005/080455 A1 | 9/2005 |
| WO | WO 2005/080456 A1 | 9/2005 |

OTHER PUBLICATIONS

Shiono et al. Makromol. Chem. Rapid. Commun. 1993, 14, 323-327.*
Bielawski et al., "Highly efficient syntheses of acetoxy- and hydroxy-terminated telechelic poly(butadiene)s using ruthenium catalysts containing N-heterocyclic ligands," Polymer 42 (2001) 4939-4945.
Morita et al., "A Ring-Opening Metathesis Polymerization (ROMP) Approach to Carboxyl- and Amino-Terminated Telechelic Poly(butadiene)s," Macromolecules 33 (2000) 6621-6623.
Maughon et al., "Synthesis of Cross-Linkable Telechelic Poly(butenylene)s Derived from Ring-Opening Metathesis Polymerization," Macromolecules 33 (2000) 1929-1935.
Hillmyer et al., "Utility of a Ruthenium Metathesis Catalyst for the Preparation of End-Functionalized Polybutadiene," Macromolecules 30 (1997) 718-721. International Preliminary Report on Patentability, International Application No. PCT/US2006/019507, dated Nov. 23, 2007.

* cited by examiner

*Primary Examiner* — Vasu Jagannathan
*Assistant Examiner* — Mark Kaucher
(74) *Attorney, Agent, or Firm* — Meredith E. Hooker; Arthur M. Reginelli

(57) ABSTRACT

A process for producing low molecular weight polymers, the process comprising partially hydrogenating an unsaturated polymer to form a partially hydrogenated polymer, and reacting the partially hydrogenated polymer with an acyclic alkene in the presence of a metathesis catalyst.

21 Claims, No Drawings

METHOD FOR PREPARING LOW MOLECULAR WEIGHT POLYMERS

CROSS-REFERENCE

This application claims priority from U.S. Provisional Application Ser. No. 60/682,938, filed May 20, 2005, and International Application No. PCT/US06/19507, Filed May 19, 2006.

FIELD OF THE INVENTION

This invention relates to a method for preparing low molecular weight polymers that can include one or more functional groups.

BACKGROUND OF THE INVENTION

Known methods of depolymerizing polydienes with metathesis catalysts produce very low molecular weight oligomers, i.e. less than 7,500 grams per mole. These methods also result in a high proportion of the end groups being non-functionalized cyclic species. It is difficult, using known methods, to control the molecular weight of the product of the depolymerization.

Low molecular weight functionalized polymers, i.e. 7,500 to 100,000 grams per mole are very desirable. For example, they could be useful in sealant or adhesive compositions, or as compatibilizing agents or plasticizers. Therefore, a method for preparing low molecular weight polymers, particularly those that are functionalized, would be desirable.

SUMMARY OF THE INVENTION

In general the present invention provides a process for producing low molecular weight polymers, the process comprising partially hydrogenating an unsaturated polymer to form a partially hydrogenated polymer, and reacting the partially hydrogenated polymer with an acyclic alkene and in the presence of a metathesis catalyst.

The present invention also includes a process for producing low molecular weight polymers, the process comprising partially hydrogenating an unsaturated polymer to form a partially hydrogenated polymer, and reacting the partially hydrogenated polymer with an acyclic alkene and in the presence of a metathesis catalyst.

DETAILED DESCRIPTION OF ILLUSTRATIVE EMBODIMENTS

1. Introduction

Low molecular weight polymers can be prepared by partially hydrogenating an unsaturated polymer and then reacting the partially hydrogenated polymer with an acyclic alkene in the presence of a metathesis catalyst.

2. Unsaturated Polymer

A. General

Unsaturated polymers include those polymers that include backbone saturation; in other words, a double bond is located in the main chain of the polymer. In one or more embodiments, the unsaturated polymer may include both backbone and vinyl unsaturation, which is pendant from the polymer chain.

B. Composition

Various unsaturated polymers may be employed. These unsaturated polymers may include both natural and synthetic polymers. In one or more embodiments, the unsaturated polymers include one or more repeat or mer units that derive from conjugated dienes. These conjugated dienes may include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Further, the process of this invention can also be utilized for the copolymerization of two or more conjugated dienes into copolymers having an essentially cis-1,4 microstructure. The unsaturated polymers may also include repeat or mer units that derive from monomer that is copolymerizable with conjugated dienes such as vinyl aromatic monomer. Useful vinyl aromatic monomer may include styrene or methyl styrene.

Exemplary unsaturated polymers include poly(isoprene), poly(butadiene), poly(isobutylene-co-isoprene), neoprene, poly(ethylene-co-propylene), poly(styrene-co-butadiene), poly(styrene-co-isoprene), and poly(styrene-co-isoprene-co-butadiene), poly(isobutylene-co-butadiene), poly(isoprene-co-butadiene), poly(ethylene-co-propylene-co-diene), and mixtures thereof.

C. Characteristics

The characteristics of the unsaturated polymer may vary, especially with respect to molecular weight. Nonetheless, in one or more embodiments, the number average molecular weight of the unsaturated polymers may be greater than 100,000 g/mole, in other embodiments greater than 200,000 g/mole, in other embodiments greater than 300,000 g/mole, and in other embodiments greater than 400,000; in these or other embodiments, the number average molecular weight may be less than 1,000,000 g/mole, in other embodiments less than 800,000 g/mole, in other embodiments less than 700,000 g/mole.

3. Hyrogenation

A. General

In general, hydrogenation adds a hydrogen atom to the unsaturation (e.g. double bond). In one or more embodiments, the process of this invention does not result in the complete hydrogenation of the unsaturated polymer, but rather only partial hydrogenation is achieved. As a result, the partially hydrogenated polymer retains some unsaturation (i.e. some double bonds remain in the backbone of the polymer).

In one or more embodiments, the process employed to partially hydrogenate the polymer is compatible with the subsequent metathesis catalysis; in other words, the method employed to partially hydrogenate the unsaturated polymer has little or no impact on the metathesis catalyst other than to reduce number of double bonds that are subsequently impacted by the catalyst.

Various techniques may be employed to partially hydrogenate the unsaturated polymer. In one or more embodiments, the unsaturated polymer may be hydrogenated by treating it with a homogeneous or heterogeneous transition metal catalyst system. Alternatively, organic systems such as diimide systems (e.g., hydrazine) may be employed. Hydrogenation techniques and catalysts for use in hydrogenation are well known as described in "Chemical Modification of Polymers: Catalytic Hydrogenation and Related Reactions" by McManus et al., *J.M.S.-Rev. Macromol. Chem. Phys.*, C35 (2), 239-285 (1995), "Coordination Catalyst for the Selective hydrogenation of Polymeric Unsaturation," by Falk, *Journal* of Polymer Science: Part A-1, Vol. 9, 2617-2623 (1971), "The Hydrogenation of HO-Terminated Telechelic Polybutadienes in the Presence of a Homogeneous Hydrogenation Catalyst Based on Tris(triphenylphosphine)rhodium Chloride" by Bouchal et al., Institute of Macromolecular Chemistry, Die Angewandte Makromolekular Chemie 165, 165-180 (Nr. 2716) (1989), Hydrogenation of Low Molar Mass OH-Telechelic Polybutadienes Catalyzed by Homogeneous Ziegler Nickel Catalysts, by Sabata et al., *Journal of Applied Polymer Science*, Vol. 85, 1185-1193 (2002), "An Improved Method for the Diimide Hydrogenation of Butadiene and Isoprene Containing, Polymers, by Hahn, *Journal of Polymer Science: Part A: Polymer Chemistry*, Vol. 30, 397-408 (1992), and Hydrogenation of Low-Molar-Mass, OH-Telechelic Polybutadienes. I. Methods Based on Diimide" by Holler, *Journal of Applied Polymer Science*, Vol 74, 3203-3213 (1999), which are incorporated herein by reference. Partial hydrogenation of conjugated dienes is described in U.S. Pat. Nos. 4,590,319, 5,242,986, and 6,184,307, all of which are hereby incorporated by reference. Partial hydrogenation of aromatic hydrocarbons to form cycloalkenes is described more fully in U.S. Pat. Nos. 4,197,415, 4,392,001, and 5,589,600, all of which are hereby incorporated by reference.

B. Level of Unsaturation Post Hydrogenation

While the degree or level of hydrogenation may vary based upon the desired properties of the end product, hydrogenation advantageously reduces the number of vinyl units or pendent double bonds present in the polymer. In one or more embodiments, the hydrogenated polymer includes less than 0.5 mole percent vinyl unsaturation, in other embodiments less than 0.25 mole percent vinyl unsaturation, and in other embodiments less than 0.1 mole percent vinyl unsaturation, where the mole percent refers to the number of vinyl double bonds with respect to the total number of double bonds present within the polymer.

In one or more embodiments, it may be useful to define the level or degree of hydrogenation in terms of the total number of double bonds (both backbone unsaturation and vinyl unsaturation) remaining after hydrogenation. In one or more embodiments less than 99 double bonds per 100 repeat units, and in other embodiments less than 50 double bonds per 100 repeat units, in other embodiments less than 25 double bonds per 100 repeat units, and in other embodiments less than 10 double bonds per 100 repeat units, and in other embodiments less than 1 double bond per 100 repeat units remain after hydrogenation. In these or other embodiments, the polymer may include greater than 0.1 double bonds per 100 repeat units, in other embodiments greater than 0.5 double bonds per 100 repeat units, and in other embodiments greater than 0.9 double bonds per 100 repeat units remain after hydrogenation.

4. Acyclic Alkene

A. General

Useful acyclic alkenes include at least one metathesis active double bond, which are double bonds that will be severed by a metathesis catalyst. In one or more embodiments, the acyclic alkene may be characterized by a molecular weight that is lower than the molecular weight of the partially hydrogenated polymer. Examples of acyclic alkenes include ethylene, propylene, butylene, pentene, and their isomers and the derivatives.

B. Functionalized Alkene

In one or more embodiments, the acyclic alkene includes one or more functional groups. In one or more embodiments, the functionalized acyclic alkene can include an alpha olefin represented by the formula

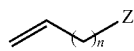

or a bis-functionalized olefin represented by the formula

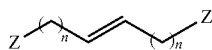

where each Z includes a functional group and n is an integer from 0 to about 20. In other embodiments, n is an integer from 1 to about 10, and in other embodiments an integer from 2 to about 6.

In one or more embodiments, functional groups include those moieties or substituents that include a hetero atom or hetero microstructure. In one or more embodiments, functional groups include those substituents or moieties that can react or interact with other chemical constituents. Examples of functional groups include hydroxyl, thiol, ketone, aldehyde, ester, ether, amine, imine, amide, nitro, carboxylic acid, disulfide, carbonate, isocyanate, carbodiimide, carboalkoxy, halogen, methacrylate, acylates, cinnamate, epoxide, lactone, cyclic carbonate, tetrahydrofuran, oxetane, lactam, phosphazene, alkoxysilane, siloxane groups, alkyltin groups, borates, and mixtures thereof.

In one embodiment, the functional group includes a crosslinkable moiety such as those that derive from methacrylates, acylates, cinnamates, epoxides, lactones, cyclic carbonates, tetrahydrofurans, oxetanes, lactams, phosphazenes, and silicon-containing groups that have a hydroxyl or hydrolyzable group bound to a silicon atom. Hydrolyzable groups include hydrogen, halogen, alkoxy, acyloxy, ketoximate, amino, amide, aminoxy, mercapto, or alkenyloxy groups. Where two or more hydrolyzable groups or hydroxyl groups are present in the silicon-containing group, they may be the same or different.

In one embodiment, the silicon-containing crosslinkable functional group can be represented by the formula

where each R independently includes a monovalent organic group containing from 1 to about 20 carbon atoms, X includes a hydrolyzable group or a hydroxyl group, and a includes an integer from 1 to about 3. Monovalent organic groups include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. In one embodiment, the monovalent organic group contains from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms.

Where Z comprises a silicon-containing crosslinkable functional group, the acyclic functionalized alkene can be represented by the formula

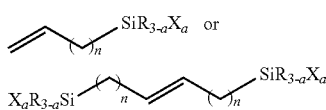

where R, X, a, and n are as described above.

Types of silicon-containing α-olefins include allyltrihalosilcane, allyldihaloslkoxysilcane, allylhalodialkoxysilane, allyltrialkoxysilane, allylalkylhaloalkoxysilane, allyldoalkylalkoxysilane, allylalkyldialkoxysilane, allylalkyldihalosilane, butenyltrihalosilcane, butenyldihaloslkoxysilcane, butenylhalodialkoxysilane, butenyltrialkoxysilane, butenylalkylhaloalkoxysilane, butenylalkyldialkylalkoxysilane, butenylalkyldialkoxysilane, butenylalkyldihalosilane, pentenyltrihalosilcane, pentenyldihaloslkoxysilcane, pentenylhalodialkoxysilane, pentenyltrialkoxysilane, pentenylalkylhaloalkoxysilane, pentenyldoalkylalkoxysilane, pentenylalkyldialkoxysilane, butenylalkyldihalosilane, hexenyltrihalosilcane, hexenyldihaloslkoxysilcane, hexenylhalodialkoxysilane, hexenyltrialkoxysilane, hexenylalkylhaloalkoxysilane, hexenyldoalkylalkoxysilane, hexenylalkyldialkoxysilane, hexenylalkyldihalosilane, heptenyltrihalosilcane, heptenyldihaloslkoxysilcane, heptenylhalodialkoxysilane, heptenyltrialkoxysilane, heptenylalkylhaloalkoxysilane, heptenyldoalkylalkoxysilane, heptenylalkyldialkoxysilane, heptenylalkyldihalosilane, octenyltrihalosilcane, octenyldihaloslkoxysilcane, octenylhalodialkoxysilane, octenyltrialkoxysilane, octenylalkylhaloalkoxysilane, octenyldoalkylalkoxysilane, octenylalkyldialkoxysilane, or octenylalkyldihalosilane.

Examples of alpha olefins where Z includes an alkoxysilyl group include allyltrichlorosilane, allyltrimethoxysilane, allyltriethoxysilane, allyltripropoxysilane, allyltributoxysilane, allylchlorodimethoxysilane, allylchlorodiethoxysilane, allylchlorodipropoxysilane, allylchlorodibutoxysilane, allyldichloromethoxysilane, allyldichloroethoxysilane, allyldichloropropoxysilane, allyldichlorobutoxysilane, allylchlorodimethoxysilane, allylchlorodiethoxysilane, allylchlorodipropoxysilane, or allylchlorodibutoxysilane.

Examples of bis-functionalized olefins include bissilyl olefins, bis alkoxysilyl olefins, and bis halosilyl olefins.

The bis-functionalized olefin may be prepared by combining a functionalized alpha olefin with a metathesis catalyst. The type of metathesis catalyst employed to prepare the bis-functionalized olefin may be the same or different as the type of metathesis catalyst employed to prepare the low molecular weight polymer. The preparation of bis-functionalized olefin is further described in co-pending Patent Application Ser. Nos. 60/648,874, 60/649,419.

5. Metathesis Catalyst

In one or more embodiments, the metathesis catalyst includes a transition metal carbene complex. Generally, suitable transition metal carbene complexes include a positively charge metal center (e.g. in the +2 or +4 oxidation state) that is penta- or hexa-coordinated. Ruthenium-based or osmium-based metathesis catalysts including carbene complexes are sometimes referred to as Grubbs catalysts. Grubbs metathesis catalysts are described in U.S. Pat. Nos. 5,312,940, 5,342,909, 5,831,108, 5,969,170, 6,111,121, 6,211,391, 6,624,265, 6,696,597 and U.S. Published App. Nos. 2003/0181609 A1, 2003/0236427 A1, and 2004/0097745 A9, all of which are incorporated herein by reference.

Ru- or Os-based metathesis catalysts include compounds that can be represented by the formula

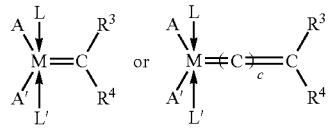

where M includes ruthenium or osmium, L and L' each independently comprise any neutral electron donor ligand, A and A' each independently comprise an anionic substituent, $R^3$ and $R^4$ independently comprise hydrogen or an organic group, and includes an integer from 0 to about 5, or where two or more of $R^3$, $R^4$, L, L', A, and A' combine to form a bidentate substituent.

In one or more embodiments, L and L' independently comprise phosphine, sulfonated phosphine, phosphite, phosphinite, phosphonite, arsine, stibnite, ether, amine, amide, imine, sulfoxide, carboxyl, nitrosyl, pyridine, thioether, trizolidene, or imidazolidine groups, or L and L' may together comprise a bidentate ligand. In one embodiment, L and/or L' include an imidizolidene group that can be represented by the formulas

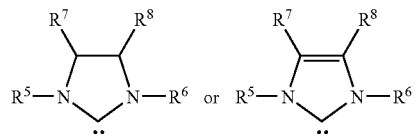

where $R^5$ and $R^6$ independently include alkyl, aryl, or substituted aryl. In one embodiment, $R^5$ and $R^6$ independently include substituted phenyls, and in another embodiment, $R^5$ and $R^6$ independently include mesityl. In one embodiment, $R^7$ and $R^8$ include alkyl or aryl, or form a cycloalkyl, and in another embodiment, are both hydrogen, t-butyl, or phenyl groups. Two or more of $R^5$, $R^6$, $R^7$ and $R^8$ can combine to form a cyclic moiety. Examples of imidazolidine ligands include 4,5-dihydro-imidazole-2-ylidene ligands.

In one or more embodiments, A and A' independently comprise halogen, hydrogen, $C_1$-$C_{20}$ alkyl, aryl, $C_1$-$C_{20}$ alkoxide, aryloxide, $C_2$-$C_{20}$ alkoxycarbonyl, arylcarboxylate, $C_1$-$C_{20}$ carboxylate, arylsulfonyl, $C_1$-$C_{20}$ alkylsulfonyl, $C_1$-$C_{20}$ alkylsulfinyl, each ligand optionally being substituted with $C_1$-$C_5$ alkyl, halogen, $C_1$-$C_5$ alkoxy, or with a phenyl group that is optionally substituted with halogen, $C_1$-$C_5$ alkyl, or $C_1$-$C_5$ alkoxy, and A and A' together may optionally comprise a bidentate ligand.

In one or more embodiments, $R^3$ and $R^4$ include groups independently selected from hydrogen, $C_1$-$C_{20}$ alkyl, aryl, $C_1$-$C_{20}$ carboxylate, $C_1$-$C_{20}$ alkoxy, aryloxy, $C_1$-$C_{20}$ alkoxycarbonyl, $C_1$-$C_{20}$ alkylthio, $C_1$-$C_{20}$ alkylsulfonyl and $C_1$-$C_{20}$ alkylsulfinyl, each of $R^3$ and $R^4$ optionally substituted with $C_1$-$C_5$ alkyl, halogen, $C_1$-$C_5$ alkoxy or with a phenyl group that is optionally substituted with halogen, $C_1$-$C_5$ alkyl, or $C_1$-$C_5$ alkoxy.

In one or more embodiments, L or L' and A or A' may combine to form one or more bidentate ligands. Examples of this type of complex are described as Class II catalysts in U.S. Pat. No. 6,696,597. In another embodiment, $R^3$ or $R^4$ and L or L' or A or A' may combine to form one or more bidentate ligands. This type of complex is sometimes referred to as Hoveyda or Hoveyda-Grubbs catalysts. Examples of bidentate ligands that can be formed by $R^3$ or $R^4$ and L or L' include ortho-alkoxyphenylmethylene ligands.

Other useful catalysts include hexavalent carbene compounds including those represented by the formula

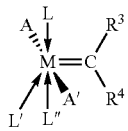

where M includes ruthenium or osmium, L, L', L" each independently comprise any neutral electron donor ligand, A and A' each independently comprise an anionic substituent, and $R^3$ and $R^4$ independently comprise hydrogen or an organic group. In a manner similar to the penta-valent catalysts described above, one or more of the substituents in the hexavalent complex may combine to form a bidentate substituent.

Examples of ruthenium-based carbene complexes include ruthenium, dichloro(phenylmethylene)bis(tricyclohexylphosphine), ruthenium, dichloro(phenylmethylene)bis(tricyclopentylphosphine), ruthenium, dichloro(3-methyl-2-butenylidene)bis(tricyclohexylphosphine), ruthenium, dichloro(3-methyl-2-butenylidene)bis(tricyclopentylphosphine), ruthenium, dichloro(3-phenyl-2-propenylidene)bis(tricyclohexylphosphine), ruthenium, dichloro(3-phenyl-2-propenylidene)bis(tricyclopentylphosphine), ruthenium, dichloro(ethoxymethylene)bis(tricyclohexylphosphine), ruthenium, dichloro(ethoxymethylene)bis(tricyclopentylphosphine), ruthenium, dichloro(t-butylvinylidene)bis(tricyclohexylphosphine), ruthenium, dichloro(t-butylvinylidene)bis(tricyclopentylphosphine), ruthenium, dichloro(phenylvinylidene)bis(tricyclohexylphosphine), ruthenium, dichloro(phenylvinylidene)bis(tricyclopentylphosphine), ruthenium[2-(((2,6-bismethylethyl)-4-nitrophenyl)imino-kN)methyl-4-nitrophenolato-kO)]chloro-(phenylmethylene)(tricyclohexylphosphine), ruthenium[2-(((2,6-bismethylethyl)-4-nitrophenyl)imino-kN)methyl-4-nitrophenolato-kO)]chloro-(phenylmethylene)(tricyclopentylphosphine), ruthenium[2-(((2,6-bismethylethyl)-4-nitrophenyl)imino-kN)methyl-4-nitrophenolato-kO)]chloro-(3-methyl-2-butenylidene)(tricyclohexylphosphine), ruthenium[2-(((2,6-bismethylethyl)-4-nitrophenyl)imino-kN)methyl-4-nitrophenolato-kO)]chloro-(3-methyl-2-butenylidene)(tricyclopentylphosphine), ruthenium[1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(phenylmethylene), ruthenium[1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(3-methyl-2-butenylidene), ruthenium, dichloro[1,3-dihydro-1,3-bis-(2,4,6-trimethylphenyl)-2H-imidazol-2-ylidene](phenylmethylene)(tricyclohexylphosphine), ruthenium, dichloro[1,3-dihydro-1,3-bis-(2,4,6-trimethylphenyl)-2H-imidazol-2-ylidene](phenylmethylene)(tricyclopentylphosphine), ruthenium, dichloro[1,3-dihydro-1,3-bis-(2,4,6-trimethylphenyl)-2H-imidazol-2-ylidene](3-methyl-2-butenylidene)(tricyclohexylphosphine), ruthenium, dichloro[1,3-dihydro-1,3-bis-(2,4,6-trimethylphenyl)-2H-imidazol-2-ylidene](3-methyl-2-butenylidene)(tricyclopentylphosphine), ruthenium, dichloro[1,3-dihydro-1,3-bis-(2,4,6-trimethylphenyl)-2H-imidazol-2-ylidene](3-phenyl-2-propenylidene)(tricyclohexylphosphine), ruthenium, dichloro[1,3-dihydro-1,3-bis-(2,4,6-trimethylphenyl)-2H-imidazol-2-ylidene](3-phenyl-2-propenylidene)(tricyclopentylphosphine), ruthenium, dichloro[1,3-dihydro-1,3-bis-(2,4,6-trimethylphenyl)-2H-imidazol-2-ylidene](ethoxymethylene)(tricyclohexylphosphine), ruthenium, dichloro[1,3-dihydro-1,3-bis-(2,4,6-trimethylphenyl)-2H-imidazol-2-ylidene](ethoxymethylene)(tricyclopentylphosphine), ruthenium, dichloro[1,3-dihydro-1,3-bis-(2,4,6-trimethylphenyl)-2H-imidazol-2-ylidene](t-butylvinylidene)(tricyclohexylphosphine), ruthenium, dichloro[1,3-dihydro-1,3-bis-(2,4,6-trimethylphenyl)-2H-imidazol-2-ylidene](t-butylvinylidene)(tricyclopentylphosphine), ruthenium, dichloro[1,3-dihydro-1,3-bis-(2,4,6-trimethylphenyl)-2H-imidazol-2-ylidene](phenylvinylidene)(tricyclohexylphosphine), ruthenium, dichloro[1,3-dihydro-1,3-bis-(2,4,6-trimethylphenyl)-2H-imidazol-2-ylidene](phenylvinylidene)(tricyclopentylphosphine), ruthenium[1,3-bis-(2,4,6-trimethylphenyl)-2-imidazolidinylidene]-dichloro(phenylmethylene)(tricyclohexylphosphine), ruthenium[1,3-bis-(2,4,6-trimethylphenyl)-2-imidazolidinylidene]-dichloro(phenylmethylene)(tricyclopentylphosphine), ruthenium,dichloro[1,3-bis-(2,4,6-trimethylphenyl)-2-imidazolidinylidene](3-methyl-2-butenylidene)(tricyclohexylphosphine), ruthenium,dichloro[1,3-bis-(2,4,6-trimethylphenyl)-2-imidazolidinylidene](3-methyl-2-butenylidene)(tricyclopentylphosphine), ruthenium,dichloro[1,3-bis-(2,4,6-trimethylphenyl)-2-imidazolidinylidene](3-phenyl-2-propylidene)(tricyclohexylphosphine), ruthenium, dichloro[1,3-bis-(2,4,6-trimethylphenyl)-2-imidazolidinylidene](3-phenyl-2-propylidene)(tricyclopentylphosphine), ruthenium[1,3-bis-(2,4,6-trimethylphenyl)-2-imidazolidinylidene]-dichloro(ethoxymethylene)(tricyclohexylphosphine), ruthenium[1,3-bis-(2,4,6-trimethylphenyl)-2-imidazolidinylidene]-dichloro(ethoxymethylene)(tricyclopentylphosphine), ruthenium[1,3-bis-(2,4,6-trimethylphenyl)-2-imidazolidinylidene]-dichloro(t-butylvinylidene)(tricyclohexylphosphine), ruthenium[1,3-bis-(2,4,6-trimethylphenyl)-2-imidazolidinylidene]-dichloro(t-butylvinylidene)(tricyclopentylphosphine), ruthenium[1,3-bis-(2,4,6-trimethylphenyl)-2-imidazolidinylidene]-dichloro(phenylvinylidene)(tricyclohexylphosphine), and ruthenium[1,3-bis-(2,4,6-trimethylphenyl)-2-imidazolidinylidene]-dichloro(phenylvinylidene) (tricyclopentylphosphine).

Commercially available Ru-based metathesis catalysts include ruthenium, dichloro(phenylmethylene)bis(tricyclohexylphosphine) (sometimes referred to as Grubbs First Generation Catalyst), ruthenium[1,3-bis-(2,4,6-trimethylphenyl)-2-imidazolidinylidene]dichloro(phenylmethylene)(tricyclohexylphosphine) (sometimes referred to as Grubbs Second Generation Catalyst), ruthenium, dichloro[[2-(1-methylethoxy)phenyl]methylene](tricyclohexylphosphine), (sometimes referred to as Hoveyda-Grubbs First Generation Catalyst), and ruthenium, [1,3-bis(2,4,6-trimethylphenyl)-2-imidazolidinylidene]dichloro[[2,(1-methylethoxy)phenyl]methylene], (sometimes referred to as Hoveyda-Grubbs Second Generation Catalyst). These Ru-based metathesis catalysts are available from Materia Inc. (Pasadena, Calif.).

In one embodiment, the Ru-based or Os-based metathesis catalyst can be prepared in situ. For example, a Ru or Os compound can be combined with an alkyne and an appropriate ligand under known conditions to form a metal carbene complex such as those described above.

Other metathesis catalysts include molybdenum and tungsten complexes, which are sometimes referred to as Schrock's carbenes; they are described in, inter alia, U.S. Pat. Nos. 4,681,956, 5,087,710, and 5,142,073, all of which are incorporated herein by reference. Other tungsten-based metathesis catalysts are further described in, inter alia, U.S. Pat.

Nos. 3,932,373, and 4,391,737, both of which are incorporated herein by reference. In some embodiments, the metathesis catalyst may be formed in situ from salts such as tungsten salts.

6. Amounts

The amount of metathesis catalyst that is contacted with the partially hydrogenated polymer can be expressed based upon the number of moles of catalyst per mole of double bonds within the partially hydrogenated polymer. In one or more embodiments, about 0.00001 to about 10 moles of catalyst per mole of double bonds, in other embodiments about 0.0001 to about 1 moles of catalyst per mole of double bond, and in other embodiments, about 0.001 to about 0.1 moles of catalyst per mole of double bond is employed.

The amount of acyclic alkene employed may also be expressed in terms of the number of moles of acyclic alkene per mole of double bonds. In one or more embodiments, about 0.01 to about 1 moles of acyclic alkene per mole of double bonds, in other embodiments about 0.001 to about 0.5 moles of acyclic alkene per mole of double bond, and in other embodiments, about 0.01 to about 0.1 moles of acyclic alkene per mole of double bond is employed. Advantageously, once the hydrogenated polymer is devoid or substantially devoid of vinyl unsaturation, the molecular weight of the low molecular weight polymers of this invention can be controlled based upon the amount of acyclic alkene employed in conjunction with the metathesis catalyst.

7. Conditions

In one or more embodiments, the partially hydrogenated polymer is reacted with the acyclic alkene in the presence of the metathesis catalyst under an inert atmosphere. In one embodiment, the acyclic alkene and partially hydrogenated polymer are first combined, and then the metathesis catalyst is subsequently added. The metathesis catalyst can be supported on an inert solid support. Or, the catalyst may be dissolved or suspended in a solvent. One or more of the acyclic alkene and partially hydrogenated polymer may be dissolved in a solvent prior to being combined.

Examples of useful solvents include organic solvents that are inert under the metathesis conditions. Suitable solvents include aromatic hydrocarbons, chlorinated hydrocarbons, ethers, aliphatic hydrocarbons, alcohols, or mixtures thereof. Examples of useful solvents include benzene, toluene, p-xylene, methylene chloride, dichloroethane, dichlorobenzene, tetrahydrofuran, diethylether, pentane, or mixtures thereof. In one embodiment, the solvent may be purified by degassing with an inert atmosphere. If desired, the solvent may be dried.

Metathesis reactions have occurred over a wide range of temperatures. In one embodiment, the partially hydrogenated polymer, the acyclic alkene, and the metathesis catalyst are combined at a temperature of from minus 40° C. to about 125° C., in another embodiment from about minus 20° C. to about 75° C., in yet another embodiment from about 0° C. to about 55° C.

The progress of the reaction can be monitored by standard techniques, e.g. gas chromatography and nuclear magnetic resonance spectroscopy. In one embodiment, the reaction is terminated by adding a catalyst deactivator. Catalyst deactivators include substances that irreversibly react with the catalyst, such as ethylvinyl ether. Conventional procedures to isolate the polymer from the solvent after reaction may be employed such as distillation precipitation or coagulation.

8. Resulting Polymer

A. Molecular Weight

In one or more embodiments, the number average molecular weight of the resulting polymer may be greater than 7,500 g/mole, in other embodiments greater than 10,000 g/mole, in other embodiments greater than 20,000 g/mole in other embodiments greater than 30,000 g/mole; in these or other embodiments, the resulting polymer may have a number average molecular weight that is less than 250,000 g/mole, in another embodiments less than 100,000 g/mole, and in other embodiments less than 80,000 g/mole.

B. Uses and Advantages

The low molecular weight functionalized polymers of one or more embodiments of this invention may be useful in sealant and adhesive compositions, as well as for compatibilizing agents and plasticizers. In some embodiments, random copolymers with low molecular weight and a wide variety of functional end-groups can be prepared. Advantageously, by partially hydrogenating the polymer to select the amount of unsaturation, it is possible to control the molecular weight of the resulting polymer. Also, the low molecular weight polymers of this invention can include hydrogenated (i.e., fully saturated) or substantially hydrogenated polymers. In other embodiments, the polymers may include backbone unsaturation. Also, in one or more embodiments of this invention, the low molecular weight polymers of this invention may be di-functional, with a functional group at both termini of the polymer.

In order to demonstrate the practice of the present invention, the following examples have been prepared and tested. The examples should not, however, be viewed as limiting the scope of the invention. The claims will serve to define the invention.

EXAMPLES

Experiment I

Sample 1

A first poly(butadiene) was prepared by polymerizing 1,3-butadiene in hexanes with an n-butyllithium initiator. The resulting polymer had a number average molecular weight of about 210 kg/mole and a vinyl content of about 9 mole percent.

Sample 2

A second poly(butadiene) was prepared by polymerizing 1,3-butadiene in hexanes with an n-butyllithium initiator. The resulting polymer had a number average molecular weight of about 200 kg/mole and a vinyl content of about 24 mole percent.

Experiment II

The polymers of Experiment I were divided into three samples each to form six samples, which will be referred to as Samples 1A, 1B, and 1C, and Samples 2A, 2B, and 2C. Each sample was then hydrogenated by contacting the polymer with tosylsulfonylhydrazide (TSC). The amount of TSC employed in each sample is provided in Table I. The amount of TSC provided in Table I includes the equivalents of TSC per double bond within the polymer (i.e., 1 equivalent TSC per butadiene mer unit). Also provided in Table I is the percent hydrogenation that was achieved; i.e., the mole percent of double bonds removed or hydrogenated by the process.

TABLE I

| Sample | 1A | 1B | 1C | 2A | 2B | 2C |
|---|---|---|---|---|---|---|
| Pre-hydrogenation vinyl content | 9% | 9% | 9% | 24% | 24% | 24% |
| Amount of TSC (eqv/double bond) | 1.0 | 1.6 | 2.0 | 1.6 | 1.5 | 2.0 |
| Hydrogenation (%) | 79 | 99 | 99.9 | 86.3 | 99 | 99.9 |

Experiment III

Portions of Samples 1A and 2A were dissolved in toluene to a 3% solids concentration and maintained in an inert atmosphere under nitrogen. To each sample was added 0.5 milliequivalents of ruthenium[1,3-bis-(2,4,6-trimethylphenyl)-2-imidazolidinylidene]dichloro(phenylmethylene)(tricyclohexylphosphine) per mole of polymer, and 0.02 moles of trans-3-hexene per mole of polymer. The solution was maintained at 50-60° C. for about 1-2 hours under nitrogen while stirring. The viscosity of the solution was monitored, and a reduction in viscosity was observed.

Experiment IV

In a similar fashion to Experiment III, portions of each of Samples, 1B, 1C, 2B, and 2C were respectively dissolved in toluene to a concentration of about 3% solids. Each solution was maintained in an inert atmosphere under nitrogen. To each sample was added 0.2 milliequivalents of ruthenium[1,3-bis-(2,4,6-trimethylphenyl)-2-imidazolidinylidene]dichloro(phenylmethylene) (tricyclohexylphosphine) per mole of polymer, and 0.02 moles of cis-diacetoxy-2-butene per mole of polymer. The solution was maintained at 50-60° C. for about 1-2 hours under nitrogen while stirring. The viscosity of the solution was monitored, and reduction in viscosity was observed.

Various modifications and alterations that do not depart from the scope and spirit of this invention will become apparent to those skilled in the art. This invention is not to be duly limited to the illustrative embodiments set forth herein.

What is claimed is:

1. A process for producing low molecular weight polymers, the process comprising:
    partially hydrogenating an unsaturated polymer to form a partially hydrogenated polymer; and
    reacting the partially hydrogenated polymer with an acyclic alkene in the presence of a Ru-based or Os-based metathesis catalyst, wherein the resulting low molecular weight polymer has a number average molecular weight of at least 7,500 g/mole and less than 250,000 g/mole, where said step of reacting includes combining from about 0.0001 to about 1 moles of acylic alkene per mole of double bonds, and from about 0.00001 to about 10 moles of metathesis catalyst per mole of double bonds with the partially hydrogenated polymer, and where the acylic alkene is functionalized.

2. The process of claim 1, where the partially hydrogenated polymer includes less than 0.5 mole percent vinyl unsaturation.

3. The process of claim 1, where the partially hydrogenated polymer includes less than 0.25 mole percent vinyl unsaturation.

4. The process of claim 1, where said step of reacting includes reacting from about 0.001 to about 0.5 moles of acyclic alkene per mole of double bonds, and from about 0.0001 to about 1 moles of metathesis catalyst per mole of double bonds with the partially hydrogenated polymer.

5. A method for forming a hydrogenated polymer the method comprising:
    reacting a partially hydrogenated polyolefin and a functionalized acyclic alkene, in the presence of a Ru-based or Os-based metathesis catalyst, to form a polymer having a number average molecular weight of from about 7,500 to about 100,000 g/mole and where said step of reacting includes combining from about 0,0001 to about 1 moles of acyclic alkene per mole of double bonds, and from about 0.00001 to about 10 moles of metathesis catalyst per mole of double bonds with the partially hydrogenated polymer.

6. The method of claim 5, where the acyclic alkene includes a functional group, and the resulting polymer is thereby functionalized.

7. The method of claim 6, where the acyclic aylkene includes two functional groups.

8. The method of claim 6, where the end-functionalized polymer comprises an alkoxysilane group.

9. The method of claim 6, where the end-functionalized polymer has a number average molecular weight of at least about 10,000 g/mol.

10. The method of claim 9, where the end-functionalized polymer has a number average molecular weight of at least about 20,000 g/mol.

11. The method of claim 5, where the hydrogenated polymer includes less than 0.5 mole percent vinyl unsaturation.

12. The method of claim 5, where the hydrogenated polymer includes less than 0.25 mole percent vinyl unsaturation.

13. The process of claim 1, where the resulting polymer has a number average molecular weight of less than 100,000 g/mole.

14. The process of claim 1, where the resulting polymer has a number average molecular weight of less than 80,000 g/mole.

15. The process of claim 1, where the partially hydrogenated polymer includes less than 0.1 mole percent vinyl unsaturation.

16. The process of claim 1, where said step of reacting includes reacting from about 0.01 to about 0.1 moles of acyclic alkene per mole of double bonds, and from about 0.0001 to about 1 moles of metathesis catalyst per mole of double bonds with the partially hydrogenated polymer.

17. The process of claim 1, where the unsaturated polymer derives from the polymerization of conjugated dienes.

18. The process of claim 17, where the unsaturated polymer is selected from the group consisting of poly(isoprene), poly(butadiene), poly(isobutylene-co-isoprene), neoprene, poly(ethylene-co-propylene), poly(styrene-co-butadiene), poly(styrene-co-isoprene), and poly(styrene-co-isoprene-co-butadiene), poly(isobutylene-co-butadiene), poly(isoprene-co-butadiene), poly(ethylene-co-propylene-co-diene), nitrile rubber, and butyl rubber.

19. The process of claim 18, where the unsaturated polymer is selected from the group consisting of poly(isoprene), poly(butadiene), poly(styrene-co-butadiene), poly(styrene-co-isoprene), and poly(styrene-co-isoprene-co-butadiene).

20. The method of claim 1, where the acyclic alkene is represented by the formula

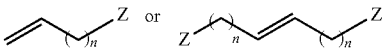

where n is an integer from 0 to about 20, and Z is a functional group.

21. The process of claim 20, where the acyclic alkene is represented by the formula

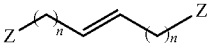

where n is an integer from 0 to about 20, and Z is a functional group.

* * * * *